US009110646B2

(12) United States Patent
Freibert (10) Patent No.: US 9,110,646 B2
(45) Date of Patent: Aug. 18, 2015

(54) COMPUTER SYSTEM, METHOD FOR PROGRAMMING A REAL-TIME CLOCK AND A COMPUTER PROGRAM PRODUCT (75) Inventor: Erich Freibert, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 264 days.

(21) Appl. No.: 13/812,962

(22) PCT Filed: Jul. 13, 2011

(86) PCT No.: PCT/EP2011/061988
§ 371 (c)(1),
(2), (4) Date: Apr. 4, 2013

(87) PCT Pub. No.: WO2012/013501
PCT Pub. Date: Feb. 2, 2012

(65) Prior Publication Data
US 2013/0205154 A1 Aug. 8, 2013

(30) Foreign Application Priority Data
Jul. 29, 2010 (DE) .......................... 10 2010 032 758

(51) Int. Cl.
*G06F 1/26* (2006.01)
*G06F 1/14* (2006.01)
*G06F 1/32* (2006.01)

(52) U.S. Cl.
CPC .. *G06F 1/26* (2013.01); *G06F 1/14* (2013.01); *G06F 1/263* (2013.01); *G06F 1/3203* (2013.01); *G06F 1/3234* (2013.01); *G06F 1/3237* (2013.01); *G06F 1/3287* (2013.01); *G06F 1/3293* (2013.01); *Y02B 60/121* (2013.01); *Y02B 60/1221* (2013.01); *Y02B 60/1282* (2013.01); *Y02B 60/32* (2013.01)

(58) Field of Classification Search
CPC ....... G06F 1/14; G06F 1/3203; G06F 1/3206; G06F 1/3237; G06F 1/3287
USPC .................................................. 713/320, 323
See application file for complete search history.

(56) References Cited

U.S. PATENT DOCUMENTS 5,216,357 A * 6/1993 Coppola et al. ................ 324/142
6,408,397 B1 * 6/2002 Alexander et al. ............ 713/340
(Continued)

FOREIGN PATENT DOCUMENTS

| DE | 695 18 114 T2 | 3/2001 |
|---|---|---|
| DE | 10 2008 031 536 A1 | 1/2010 |
| DE | 10 2008 039 795 B3 | 1/2010 |
| EP | 0 684 539 B1 | 7/2000 |
| EP | 1 233 325 A2 | 8/2002 |
| GB | 2 455 744 A | 6/2009 |
| JP | 9-69998 | 3/1997 |
| JP | 2000-175141 | 6/2000 |
| JP | 2000-350142 | 12/2000 |
| JP | 2002-152645 | 5/2002 |
| JP | 2007-234145 | 9/2007 |
| JP | 2008-187376 | 8/2008 |

OTHER PUBLICATIONS

Japanese Examination Report dated Feb. 12, 2014 for corresponding Japanese Application No. 2013-521053.

*Primary Examiner* — Stefan Stoynov
(74) *Attorney, Agent, or Firm* — DLA Piper LLP (US)

(57) ABSTRACT

A computer system includes at least one system component including a first realtime clock that produces interrupt requests, at least one power supply unit that supplies the system component with at least one operating voltage, wherein the power supply unit includes at least one microcontroller having a second realtime clock, and at least one firmware component, wherein the firmware component transfers programming of the first realtime clock to the second realtime clock before the computer system changes to a switched-off state or an energy-saving state.

17 Claims, 4 Drawing Sheets

(56) References Cited

U.S. PATENT DOCUMENTS

| | | | |
|---|---|---|---|
| 6,938,178 B2* | 8/2005 | Yano | 713/500 |
| 7,343,504 B2* | 3/2008 | Fernald et al. | 713/322 |
| 7,873,849 B2* | 1/2011 | Mucignat et al. | 713/323 |
| 2001/0026533 A1 | 10/2001 | Schwager | |
| 2006/0190752 A1* | 8/2006 | Lee | 713/323 |
| 2008/0288557 A1* | 11/2008 | Chiu | 707/202 |
| 2010/0058088 A1 | 3/2010 | Busch et al. | |
| 2011/0101775 A1 | 5/2011 | Busch | |

* cited by examiner

COMPUTER SYSTEM, METHOD FOR PROGRAMMING A REAL-TIME CLOCK AND A COMPUTER PROGRAM PRODUCT

RELATED APPLICATIONS

This is a §371 of International Application No. PCT/EP2011/061988, with an international filing date of Jul. 13, 2011 (WO 2012/013501 A1, published Feb. 2, 2012), which is based on German Patent Application No. 10 2010 032 758.1, filed Jul. 29, 2010, the subject matter of which is incorporated herein by reference.

TECHNICAL FIELD

This disclosure relates to a computer system comprising at least one system component comprising a realtime clock that produces interrupt requests and at least one power supply unit for supplying power to the system component. The disclosure also relates to a method of programming a realtime clock in a computer system with an energy-saving state and a computer program product having executable program code that carries out the method.

BACKGROUND

Practically all current computer systems have one or more realtime clocks. Realtime clocks are used particularly to continually update a system time for the computer system. Furthermore, known realtime clocks often have what is known as an alarm function, which can be used to initiate interrupt requests under time control. The interrupt requests initiated by a realtime clock can be intercepted by another hardware or software component, particularly a BIOS program or an operating system executed by a processor in the computer system, and used to initiate the execution of user-controlled processes.

One problem with the known computer systems is that it is not possible for programming of the realtime clocks to be successfully checked in every state of the computer system. Particularly when the computer is in a completely switched-off state, a relevant interrupt request is either not initiated by the realtime clock chip or not evaluated by another hardware or software component. In this case, tasks prescribed by the user are sometimes not executed.

If the computer system is in what is known as a standby state, on the other hand, it is possible to initiate and evaluate such interrupt requests. In that case, however, there is the disadvantage that the computer system in the standby state usually needs to continue to be supplied with an operating voltage, with the result that electrical power is consumed independently of the actual use of the computer system. In the case of mains-operated computer systems, that results in a reduction in efficiency, and in the case of battery-operated systems, it results in premature exhaustion of the battery cells used.

It could therefore be helpful to provide a computer system, a method of programming a realtime clock and a computer program product which wholly or partially overcome the aforementioned disadvantages, and to provide a computer system and a method of operation thereof which allow time-controlled events to be monitored without requiring the computer system to be constantly supplied with power.

SUMMARY

I provide a computer system including at least one system component including a first realtime clock that produces interrupt requests, at least one power supply unit that supplies the system component with at least one operating voltage, wherein the power supply unit includes at least one microcontroller having a second realtime clock, and at least one firmware component, wherein the firmware component transfers programming of the first realtime clock to the second realtime clock before the computer system changes to a switched-off state or an energy-saving state.

I also provide a method of programming a realtime clock in a computer system with an energy-saving state, including sensing an intended wakeup time with a software component of the computer system, transmitting the sensed wakeup time to a hardware or software interface to program a first realtime clock of a system component, and programming a second realtime clock of a microcontroller of a power supply device on the basis of the transmitted wakeup time before the computer system changes to a switched-off state or an energy-saving state.

I further provide a non-transitory computer program product including an executable program code, wherein execution of the executable program code by at least one data processing unit or a microcontroller of a computer system includes a method including receiving notification of an intended wakeup time, programming a first realtime clock of a system component according to the received notification, and programming a second realtime clock of a microcontroller of a power supply device on the basis of the received notification before the computer system changes to a switched-off state or an energy-saving state.

BRIEF DESCRIPTION OF THE DRAWINGS

My systems and methods are explained in more precise detail with reference to figures, in which.

REFERENCE SYMBOLS

1 Computer system
2 Power supply unit
3 System component
4 Switched-mode converter
5 Power supply system
6 Switching component
7 Microcontroller
8 Voltage source
9 Realtime clock
10 Data processing unit
11 Nonvolatile memory
12 Power supply connection
13 BIOS battery
14 Realtime clock
15 Switching element 16 System management bus
17 Interface connection
18 Bus interface
20 Supplementary battery
21 Mains input filter
22 Rectifier
23 Current limiting element
24 Second relay
25 Third relay
30 Software level
31 User software
32 Operating system software
33 Firmware level
34 BIOS program
35 Control program
40 Screen mask

DETAILED DESCRIPTION

I provide a computer system comprising at least one system component comprising a first realtime clock that produces interrupt requests, at least one power supply unit that supplies the system component with at least one operating voltage and at least one firmware component. In that case, the power supply unit comprises at least one microcontroller having a second realtime clock, and the firmware component is set up to transfer programming of the first realtime clock to the second realtime clock before the computer system changes to a switched-off state or an energy-saving state.

The interaction of a firmware component with a first realtime clock of a system component and with a second realtime clock, which is contained in a microcontroller of a power supply unit, allows programming of a system component to be transferred to the microcontroller of a power supply unit. In this way, it is possible for the programming to be monitored and possibly for the computer system to be activated by the power supply unit even when the system component itself is not being supplied with an operating voltage at the programmed time.

The at least one firmware component, for example, a BIOS program and/or a control program for the microcontroller, may be set up to transfer programming of the second realtime clock to the first realtime clock when the computer system changes to an operating state or a standby state. If the programming of the first realtime clock is erased as a result of the operating voltage being isolated from the system component, it can be performed again with the values from the second realtime clock when the computer system is reactivated.

The power supply unit may be set up to isolate the system component having the first realtime clock completely from the operating voltage in the switched-off state or the energy-saving state. The microcontroller may be set up to monitor the programming of the second realtime clock in the energy-saving state and, when a wakeup time is reached, to activate the power supply unit to supply the system component with an operating voltage.

This means that it is possible to ensure that the computer system is woken at a programmed time despite the system component being completely decoupled from an operating voltage.

The computer system may be characterized by at least one switching element that electrically isolates the power supply unit from a primary AC voltage of a power supply system. The computer system may also be characterized by at least one energy buffer to supply the microcontroller with an operating power independently of the power supply system. In this case, the microcontroller is set up to isolate the power supply unit from the primary AC voltage by the switching element in the switched-off state or the energy-saving state. Such a computer system has the advantage that no further voltage is drawn from the power supply system in the switched-off or energy-saving state, with the result that what is known as the standby power is 0 watts.

The system component may comprise a battery, and the microcontroller of the power supply unit and the battery of the system component electrically connect to one another. In this way, the battery of the system component, particularly a BIOS battery which is already present, can be used as an energy buffer to supply power to the microcontroller in the energy-saving state. It is therefore possible to dispense with the use of further batteries, particularly in the power supply unit.

The aforementioned is likewise achieved by a method of programming a realtime clock in a computer system with an energy-saving state, comprising the following steps:

an intended wakeup time is sensed by a software component of the computer system, the sensed wakeup time is transmitted to a hardware or software interface for the purpose of programming a first realtime clock of a system component, and a second realtime clock of a microcontroller of a power supply device is programmed on the basis of the transmitted wakeup time before the computer system changes to a switched-off state or an energy-saving state.

The aforementioned steps ensure that the wakeup time programmed by a software component continues to be available and to be able to be monitored independently of the operation of the first realtime clock.

The method may furthermore comprise the steps of sensing a request to change to the energy-saving state and deactivate the power supply unit, with the result that the system component is no longer supplied with an operating voltage in the energy-saving state. The steps allow the implementation of what is known as an "0W energy-saving mode" with a wake-up function.

The step of transmission first involves the first realtime clock being programmed and, when the request to change to the energy-saving state has been sensed, the second realtime clock is programmed on the basis of the programming of the first realtime clock. Such a method is totally transparent for a software component of the computer system, with the second realtime clock being programmed only when needed.

The method may be characterized in that the programming of the second realtime clock involves a predetermined lead time being deducted from the transmitted wakeup time. The deduction of a predetermined lead time allows compensation for a delay which the computer system needs to achieve an operational state to perform the intended action in good time at the intended wakeup time.

Figure 1:
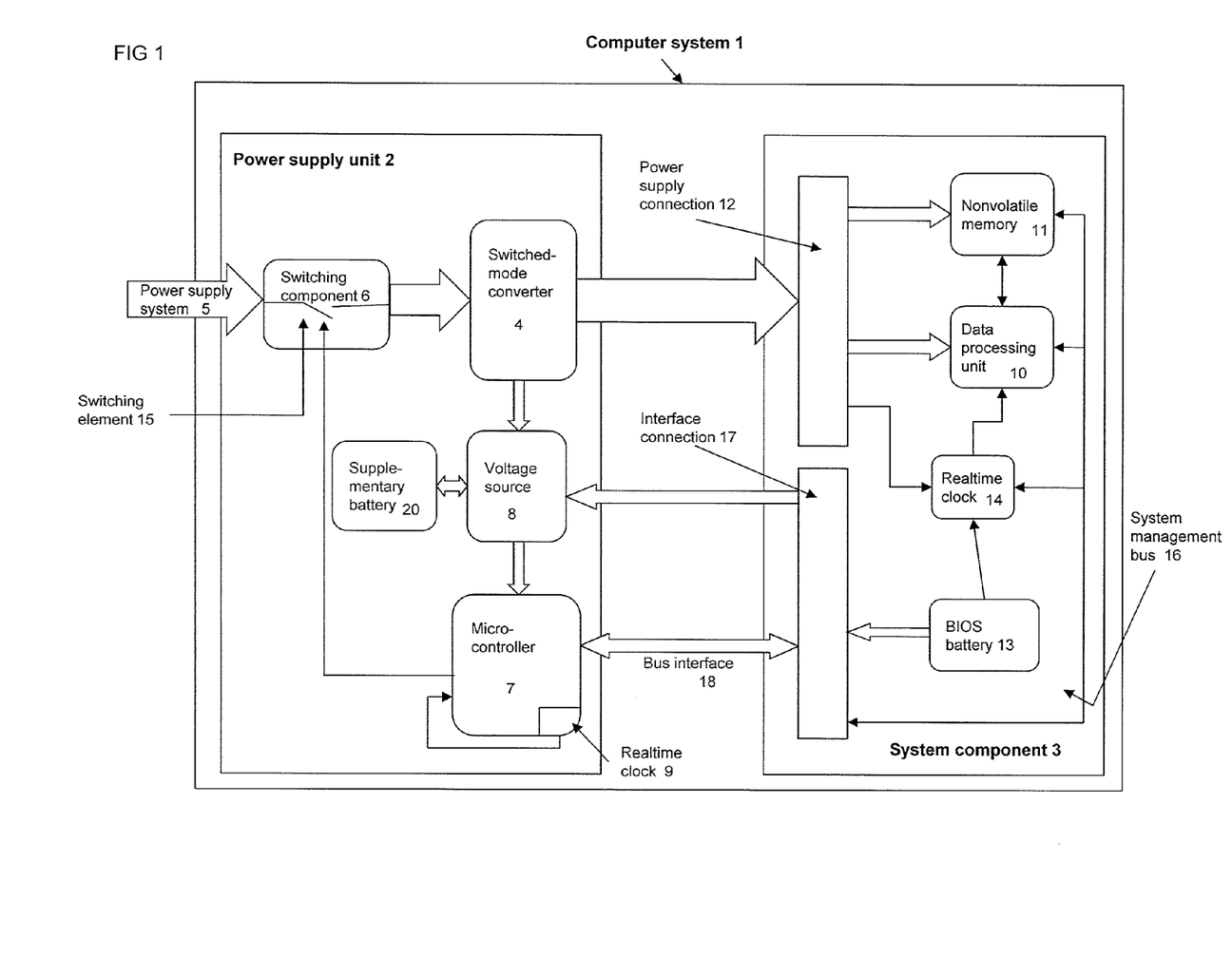
FIG. 1 shows a schematic illustration of an example of my computer system.

FIG. 1 shows a schematic illustration of a computer system 1. The computer system 1 comprises a power supply unit 2 and a system component 3.

By way of example, the power supply unit 2 is a computer power supply unit having one or more integrated switched-mode converters 4. The switched-mode converter 4 is used to convert a primary AC voltage of a power supply system 5 into one or more secondary DC voltages to operate the computer system 1, particularly the system component 3 thereof. A switching component 6 is arranged between the power supply system 5 and the switched-mode converter 4 to keep the power loss from the power supply unit 2 in the disconnected state as low as possible. By way of example, the switching component 6 may be a relay or a semiconductor switching element.

Furthermore, the power supply unit 2 has a microcontroller 7. The microcontroller 7 is supplied with an operating power by a voltage source 8. By way of example, the voltage source 8 is a simple circuit which produces a constant voltage from a voltage of a BIOS battery or other energy source. Alternatively, a highly efficiency switched-mode converter of very simple design may also be provided in the power supply unit 2 for the purpose of exclusively supplying power to the microcontroller 7 from the power supply system 5. The microcontroller 7 preferably has a particularly low power draw and has an incorporated realtime clock 9 or another timer to initiate time-controlled actions. Once a predetermined time has been reached, the realtime clock 9 initiates an interrupt request and thus wakes the microcontroller 7 from a standby state. The microcontroller 7 then actuates the switching component 6 such that the switched-mode converter 4 connects to the power supply system 5 and subsequently provides an operating voltage for the system component 3.

The system component 3, for example, a mainboard of the computer system 1, may comprise a data processing device 10 and also a nonvolatile memory 11 to store a BIOS program. The nonvolatile memory 11 may be in the form of a flash memory, for example. The data processing device 10 may be a processor, for example. The system component 3 furthermore has a BIOS battery 13 and also a realtime clock 14. The BIOS battery 13, the realtime clock 14 and the nonvolatile memory chip 11 may be arranged on the system component 3 as a standard part or as a separate component. Alternatively, it is also possible to integrate portions of these functional units or all of the functional units into a chipset of the system component 3.

The data processing unit 10, the nonvolatile memory 11 and the realtime clock 14 are supplied with an operating voltage by the power supply unit 2 in an operating or standby state of the computer system 1 via a power supply connection 12, designed according to the ATX or BTX standard, for example. Individual components of the system component 3 can be disconnected or operated at a reduced power to save energy in the standby state. By way of example, it is possible for the actual arithmetic and logic unit of the data processing unit 10 to be supplied with a reduced operating clock or with no further operating clock at all. So long as the realtime clock 14 is supplied with an operating voltage, it monitors previously programmed wakeup times and, upon reaching such a wakeup time, initiates an interrupt request which is processed via the data processing element 10, provided that the data processing element 10 is also supplied with an operating voltage at this time.

The components 10, 11 and 14 connect to one another by a system management bus 16. The system management bus 16 can be used by the data processing element 10 to program or retrieve particularly settings for the realtime clock 14. The system management bus 16 is furthermore coupled to the power supply unit 2 by an interface connection 17. The interface connection 17 can be used to interchange data between the microcontroller 7 of the power supply unit 2 and the data processing unit 10 or other components of the system component 3. To this end, the interface connection 17 comprises a bus interface 18 to couple the system management bus 16 to an interface of the same type on the microcontroller 7 of the power supply unit 2.

The interface connection 17 may additionally comprise a connection for transferring the voltage of the BIOS battery 11 of the system component 3. In the case of conventional computer systems, the BIOS battery 11 is used to back up the setting for a volatile memory, particularly a BIOS chip, even in the event of an interruption in a supply voltage and to continue to operate a clock circuit for the realtime clock 14 of the system component 3. In the example shown in FIG. 1, the voltage of the BIOS battery 13 is additionally supplied to the voltage source 8 to supply power to the microcontroller 7. Hence, it is possible to dispense with a separate battery in the supply device 2.

If the aim is to avoid an increased load for the BIOS battery 13 of the system component 3, or such a battery is not arranged on the system component 3, there may alternatively or additionally also be a supplementary battery 20 or another energy store provided in the supply device 2, however. Preferably, the supplementary battery 20 is charged by the switched-mode converter 4 in the switched-on state. If all energy stores in the computer system 1 have been completely discharged, the power supply unit additionally comprises a switching element 15 to manually close the switching component 6.

Figure 2:
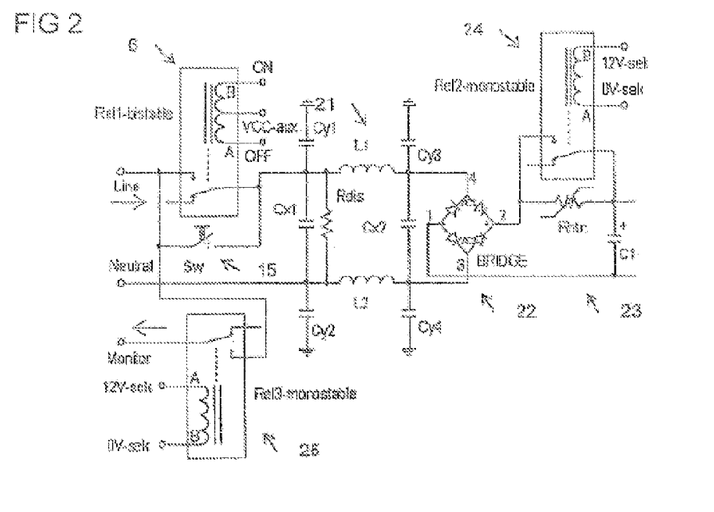
FIG. 2 shows a schematic illustration of a mains input circuit for a power supply unit.

FIG. 2 shows an example of a mains input circuit of the power supply unit 2. The circuit shown in FIG. 2 comprises a switching component 6 in the form of a bistable relay, a switching element 15 in the form of a momentary contact switch, a passive mains input filter 21, a rectifier 22 in the form of a Graetz bridge and a current limiting element 23 in the form of an NTC thermistor Rntc. The current limiting element 23 can be bypassed by a second relay 24 to prevent power losses from the current limiting element 23 during operation. Arranged downstream of the current limiting element 23 is a storage capacitor C1 used to supply power to a switched-mode converter, which is not shown in FIG. 2. The circuit shown in FIG. 2 additionally has a switching output for a monitor, connected by a third relay 25 in an operating state of the supply device 2.

The operation and actuation of the circuit shown is not discussed in more detail here. However, it is possible to see from the circuit diagram in FIG. 2 that correct actuation of the relay 6 allows a power draw by the supply device 2 to be stopped completely in an energy-saving state or switched-off state by virtue of a load path on the mains input of the storage capacitor C1 being interrupted.

Figure 3:
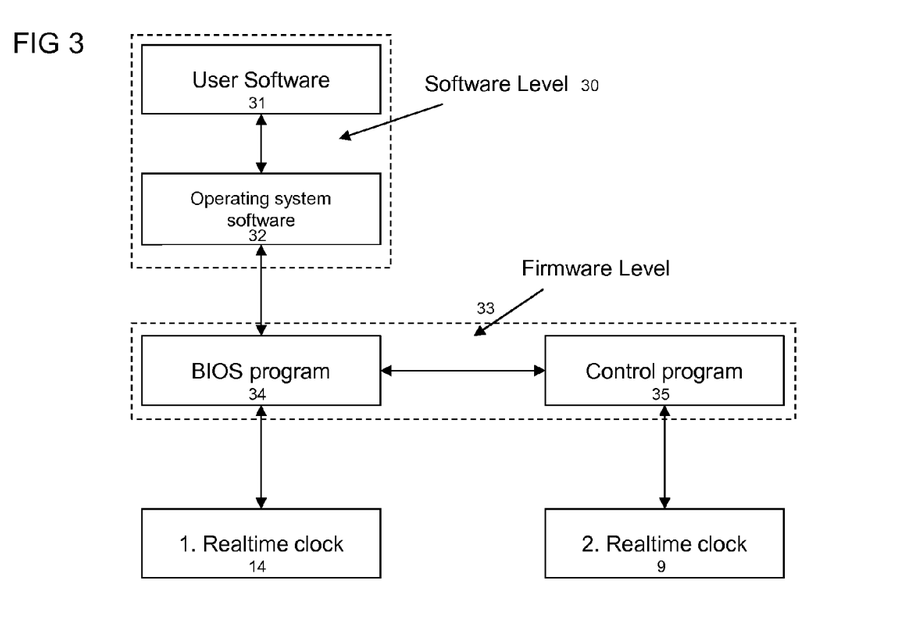
FIG. 3 shows a schematic illustration of a software architecture for programming a realtime clock.

FIG. 3 shows a schematic illustration of software components to program the realtime clocks 9 and 14. The actuation is effected by a multilevel actuation hierarchy.

A software level 30 contains a piece of user software 31 and a piece of operating system software 32. The user software 31, for example, a program to record and reproduce video data, uses an interface, which is dependent on the operating system, to access the operating system software 32. The user software 31 uses this interface to convey to the operating system 32 requests concerning when the computer 1 needs to be available for a particular function, for example, to record a television program. Such requests and other time-dependent requests can also be initiated by the operating system software 32 itself, for example, for the purpose of performing a regular data backup.

The software level 30 handles the queries by resorting to a firmware level 33. In the example, the firmware level 33 comprises particularly a BIOS program 34 stored in the nonvolatile memory 11 of the system component 3. The BIOS program 34 holds ready platform-specific software interfaces to actuate hardware components of the computer system 1. In one example, the BIOS program 34 has an interface to program the realtime clock 14 of the system component 3.

The firmware level 33 likewise contains a control program 35 executed by the microcontroller 7 of the power supply unit 2. The control program 35 communicates with the BIOS program 34 via the bus interface 18. In particular, the BIOS program 34 and the control program 35 interchange data about the changing of an operating state of the computer system 1. Furthermore, the BIOS program 34 is able to transfer programming for the realtime clock 14 of the system component 3 to the control program 35 for the purpose of programming the realtime clock 9 of the power supply unit 2, and vice versa.

Figure 4:
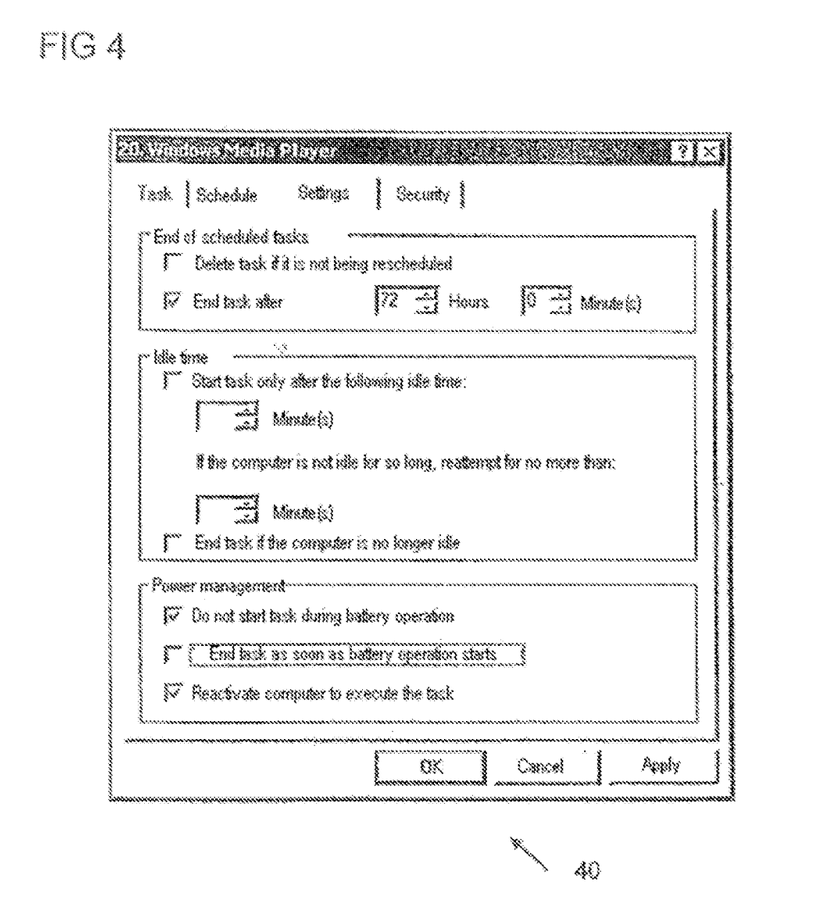
FIG. 4 shows a screen mask for a software component for programming a realtime clock.

FIG. 4 shows a screen mask 40 for a component of the operating system 32 to program a realtime clock. The screen mask 40 can be used to set various properties of the program (task) to be executed. In particular, a lower region of the screen mask 40 can be used to select that the computer system 1 needs to be (re)activated for the purpose of executing a task. When an appropriate checkmark is set, the operating system 32 programs the realtime clock 14 such that when the previously selected execution time is reached an interrupt request is transmitted from the realtime clock 14 to the data processing unit 10 to execute the specified task.

Figure 5:
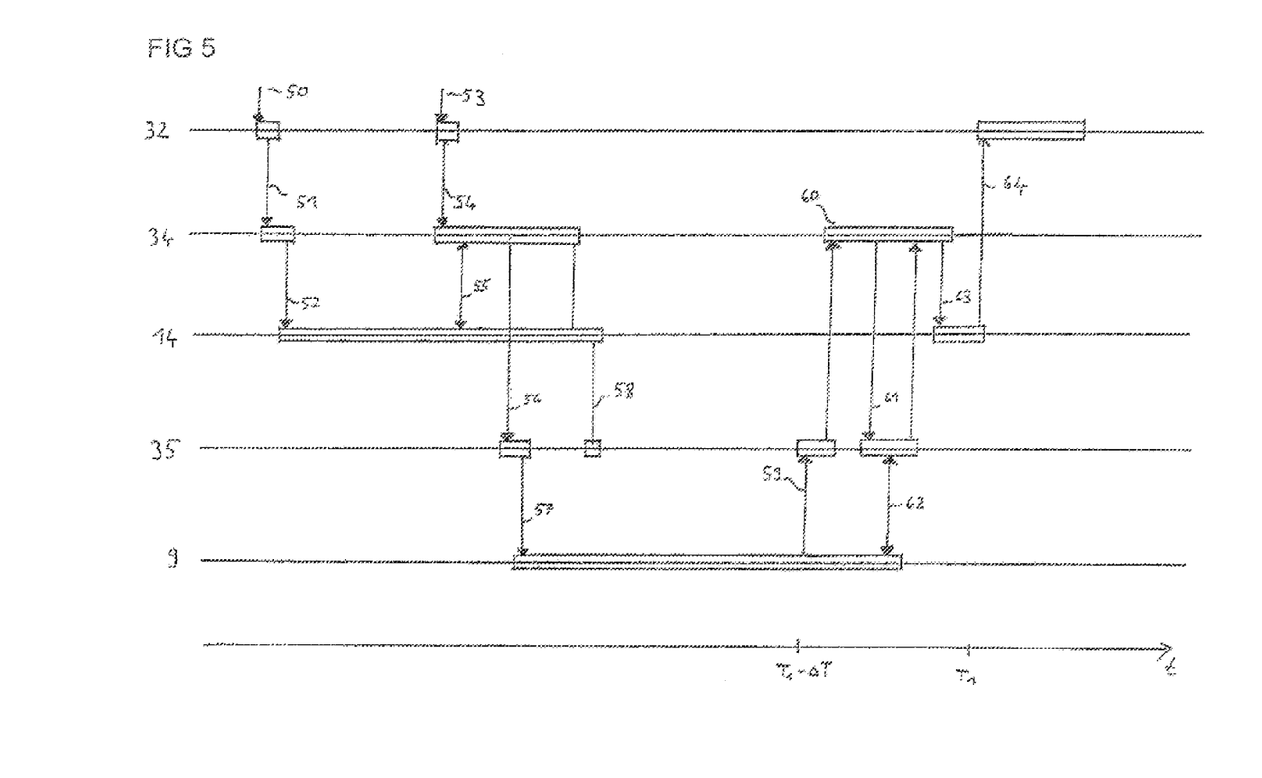
FIG. 5 shows a schematic illustration of a method for programming and waking a computer system from an energy-saving state.

FIG. 5 shows the chronology of programming of the realtime clocks 14 and 9 and activation of the computer system 1 at a predetermined time. FIG. 5 also reveals the interaction of the different components, in particular.

In a step 50, a task which needs to be executed by the computer system 1 at a predetermined time T1 is specified by means associated with the operating system 32. By way of example, the screen mask 40 can be used to prescribe that a predetermined program needs to be executed on the computer system 1 at the predetermined time T1. Alternatively, programming is also possible by higher software layers such as the user software 31, in particular. By way of example, a program that records a digital media stream can be programmed to record a digital data stream at the predetermined time T1.

In a step 51, the predetermined time T1 is transferred to an interface of the BIOS program 34. The BIOS program 34 then programs the realtime clock 14 in step 52. Alternatively, the user software 31 or the operating system 32 programs the realtime clock 14 directly via a hardware interface, for example, by writing appropriate values directly to a control register of a realtime clock chip. In this case, steps 51 and 52 coincide.

The realtime clock 14 of the computer system 1 is now programmed and returns an interrupt request to the operating system 32 at a predetermined time T1. However, this is possible only while the system component 3 is supplied with an operating voltage and programming of the realtime clock 14 is maintained.

In FIG. 5, a request to change to an energy-saving state is sent by the operating system 32 in a step 53 even before the predetermined time T1 has been reached, however. The request is received by the BIOS program 34 in a step 54.

Instead of putting the computer system 1 into the energy-saving state immediately, the BIOS program 34 first reads the programming of the realtime clock 14 in a step 55. In a step 56, the programming which has been read is transferred to the control program 35 of the microcontroller 7 via the bus interface 18. The control program 35 then programs the realtime clock 9 of the microcontroller 7 in step 57.

During programming of the realtime clock 9, either the BIOS program 34 or the control program 35 can optionally deduct a predetermined lead time $\Delta T$ from the predetermined time T1. By way of example, the lead time $\Delta T$ then takes account of the circumstance that the computer system requires a certain time to start before the actual function, for example, recording of the digital media stream, can begin successfully.

Once the realtime clock 9 has been programmed successfully, a command is transferred from the BIOS program 34 to the control program 35 in a subsequent step to activate the energy-saving state. In particular, the control program 35 is able, having received this request, to interrupt the switching component 6 in a step 58 to isolate a switched-mode converter 4 in the power supply unit 2 from a power supply system 5.

Alternatively, the BIOS program 34 can also merely transmit a request to change to the energy-saving state to the microcontroller 7. In this case, the control program 35 autonomously retrieves the programming from the first realtime clock 14 and transfers it to the second realtime clock 9 before the power supply to the system component 3 is interrupted.

The computer system 1 is now in an energy-saving state in which the power supply unit 2 draws no further power from the power supply system 5. In this operating state, only the realtime clock 9 of the microcontroller 7 is supplied with power by an independent energy source incorporated in the computer system 1. In the example, this is particularly the voltage source 8 of the power supply unit 2, supplied with an operating voltage by the BIOS battery 13.

At a time $T1-\Delta T$ which is ahead of the predetermined time T1 by the lead time $\Delta T$, the realtime clock 9 triggers an interrupt request. This results in the microcontroller 7 being woken in step 59. The control program 35 of the microcontroller 7 then closes the switching component 6, with the result that the switched-mode converter 4 supplies the system component 3 with an operating voltage again. Depending on a preset for the control program 7, the computer system 1 can be put either into a standby state or into an operating state, in which at least portions of the system component 3 are supplied with an operating voltage.

In step 60, a portion of the BIOS program 34 activated immediately after the change to such an operating state is then executed. If programming of the realtime clock 14 of the system component 3 has been erased as a result of the power supply having been interrupted, the programming of the realtime clock 9 is checked by the microcontroller 7 in a subsequent, optional step 61. The programming is read by the microcontroller 7 in step 62 and transferred back to the BIOS program 34. In a further step 63, the BIOS program 34 then reprograms the realtime clock 14 of the system component 3. During programming of the realtime clock 14, the lead time $\Delta T$ which may have been deducted beforehand is added to the original programming again. In this case too, the programming can be performed by bypassing the BIOS program 34. By way of example, the microcontroller 7 can program the realtime clock 14 directly by setting appropriate register values.

Alternatively, the programming is additionally stored in a nonvolatile memory of the system component 3. By way of example, programming of the realtime clock 14 can be stored in a battery-buffered CMOS-RAM by the BIOS program 34 before the energy-saving state is activated. When the BIOS program has been reactivated, it then copies the values back to the realtime clock 14.

Once the predetermined time T1 is finally reached, the realtime clock 14 is thus in an activated state and initiates the previously programmed interrupt request. This is transferred to the operating system 32 in a step 64 and from there possibly on to a piece of user software 31 to execute the desired action.

In FIG. 5, the realtime clock 9 of the microcontroller 7 is programmed only when the energy-saving state is activated or when the computer system 1 is disconnected in controlled fashion. Alternatively or in addition, it is also possible for the programming of the interrupt request in steps 50 to 52 also to be immediately accompanied by programming of the realtime clock 9 in the power supply unit 2. In this case, steps 56 and 57 are already executed before the energy-saving state is requested in step 53. In this case, no further steps need to be performed when the energy-saving state is activated. The realtime clock 9 is in this case programmed correctly even if the computer system 1 crashes or is unforeseeably isolated from a power supply.

It is also possible to dispense with the provision and programming of the realtime clock 14 of the system component 3 completely if care is always taken to divert queries to a realtime clock of the system component 3 to the realtime clock 9 of the power supply unit 2 via the BIOS program 34 and/or the control program 35.

It is also possible to make the response of the control program 35 dependent on a chosen mode of operation. By way of example, a BIOS setting can be used to select that the realtime clock 9 is programmed when changing to an energy-saving state, with the result that the computer system changes to the operating state at a predetermined time T, whereas such programming is not performed when changing to a switched-off state, with the result that corresponding programming is not executed.

The realtime clocks 9 and 14 can be programmed not only by the software components 31 and 32 of the computer system 1 itself, but also remotely, for example, by a maintenance computer via a remote control interface. In this way, it is particularly possible to set a predetermined maintenance interval for a computer system 1, in which the computer system can be woken by remote checks.

Preferably, the aforementioned method is implemented by an executable program code stored in the nonvolatile memory of the system component and/or in a nonvolatile memory of the microcontroller for a power supply unit. If the computer system already has two mutually independent realtime clocks, such functionality can also be retrofitted by subsequently installing such a program code, for example, by updating a BIOS program.

The invention claimed is:

1. A computer system comprising:
at least one system component comprising a first realtime clock that produces interrupt requests,
at least one power supply unit that supplies the system component with at least one operating voltage, wherein the power supply unit comprises at least one microcontroller having a second realtime clock, and
at least one firmware component, wherein the firmware component transfers programming of the first realtime clock to the second realtime clock before the computer system changes to a switched-off state or an energy-saving state.

2. The computer system according to claim 1, wherein the at least one firmware component transfers programming of the second realtime clock to the first realtime clock when the computer system changes to an operating state or a standby state.

3. The computer system according to claim 2, wherein the at least one firmware component comprises a BIOS program and/or a control program for the microcontroller.

4. The computer system according to claim 1, wherein the at least one firmware component comprises a BIOS program and/or a control program for the microcontroller.

5. The computer system according to claim 1, wherein
the power supply unit isolates at least the system component having the first realtime clock completely from the operating voltage in the switched-off state or the energy-saving state, and
the microcontroller monitors the programming of the second realtime clock in the energy-saving state and, when a wakeup time is reached, activates the power supply unit to supply the system component with an operating voltage.

6. The computer system according to claim 5, wherein the at least one firmware component transfers programming of the second realtime clock to the first realtime clock after activation of the power supply unit to supply the system component with an operating voltage.

7. A method of programming a realtime clock in a computer system with an energy-saving state, comprising:
sensing an intended wakeup time with a software component of the computer system,
transmitting the sensed wakeup time to a hardware or software interface to program a first realtime clock of a system component, and
programming a second realtime clock of a microcontroller of a power supply device on the basis of the transmitted wakeup time before the computer system changes to a switched-off state or an energy-saving state.

8. The method according to claim 7, further comprising:
sensing a request to change to the energy-saving state, and
deactivating the power supply unit when the second realtime clock has been programmed such that the system component is no longer supplied with an operating voltage in the energy-saving state.

9. The method according to claim 8, wherein the transmitting involves the first realtime clock being programmed and, when a request to change to the energy-saving state has been sensed, the second realtime clock is programmed on the basis of the programming of the first realtime clock.

10. The method according to claim 7, further comprising:
continuously monitoring the second realtime clock for the occurrence of a wakeup signal, and
activating the power supply unit to supply the system component with an operating voltage when the wakeup signal occurs.

11. The method according to claim 10, further comprising:
programming the first realtime clock on the basis of programming of the second realtime clock when the power supply unit has been activated.

12. The method according to claim 10, further comprising:
programming a nonvolatile memory of the system component on the basis of the transmitted wakeup time before the computer system changes to the switched-off state or the energy-saving state, and
programming the first realtime clock on the basis of the programming of the nonvolatile memory of the system component when the power supply unit has been activated.

13. A non-transitory computer program product comprising an executable program code, wherein execution of the executable program code by at least one data processing unit or a microcontroller of a computer system includes a method comprising:
receiving notification of an intended wakeup time,
programming a first realtime clock of a system component according to the received notification, and
programming a second realtime clock of a microcontroller of a power supply device on the basis of the received notification before the computer system changes to a switched-off state or an energy-saving state.

14. The non-transitory computer program product of claim 13, wherein the execution of the executable program code further comprises:
programming the first realtime clock on the basis of the programming of the second realtime clock when the power supply unit is activated.

15. A computer system comprising:
at least one system component comprising a first realtime clock that produces interrupt requests,
at least one power supply unit that supplies the system component with at least one operating voltage, wherein the power supply unit comprises at least one microcontroller having a second realtime clock, and
at least one firmware component, wherein the firmware component transfers programming of the first realtime clock to the second realtime clock before the computer system changes to a switched-off state or an energy-saving state,
wherein the power supply unit isolates at least the system component having the first realtime clock completely from the operating voltage in the switched-off state or the energy-saving state,
the microcontroller monitors the programming of the second realtime clock in the energy-saving state and, when a wakeup time is reached, activates the power supply unit to supply the system component with an operating voltage,
at least one switching element that isolates the power supply unit from a primary AC voltage of a power supply system, and
at least one energy buffer that supplies the microcontroller with an operating power independently of the power supply system, wherein the microcontroller isolates the power supply unit from the primary AC voltage by the switching element in the switched-off state or the energy-saving state.

16. The computer system according to claim 15, wherein the system component comprises a battery, and the microcontroller of the power supply unit and the battery of the system component electrically connect to one another such that the battery is an energy buffer to supply power to the microcontroller in the energy-saving state.

17. A method of programming a realtime clock in a computer system with an energy-saving state, comprising:
sensing an intended wakeup time with a software component of the computer system,
transmitting the sensed wakeup time to a hardware or software interface to program a first realtime clock of a system component, and
programming a second realtime clock of a microcontroller of a power supply device on the basis of the transmitted wakeup time before the computer system changes to a switched-off state or an energy-saving state,
wherein the programming of the second realtime clock involves a predetermined lead time being deducted from the transmitted wakeup time.

* * * * *

UNITED STATES PATENT AND TRADEMARK OFFICE
CERTIFICATE OF CORRECTION

| | |
|---|---|
| PATENT NO. | : 9,110,646 B2 |
| APPLICATION NO. | : 13/812962 |
| DATED | : August 18, 2015 |
| INVENTOR(S) | : Erich Freibert |

It is certified that error appears in the above-identified patent and that said Letters Patent is hereby corrected as shown below:

In the claims,

In Column 9

At line 55, please change "claim 2" to --claim 1--.

Signed and Sealed this
Sixteenth Day of February, 2016

Michelle K. Lee
*Director of the United States Patent and Trademark Office*